(12) United States Patent
Mayer-Ullmann et al.

(10) Patent No.: US 7,673,287 B2
(45) Date of Patent: Mar. 2, 2010

(54) TESTING USABILITY OF A SOFTWARE PROGRAM

(75) Inventors: Dietrich Mayer-Ullmann, Ilvesheim (DE); Ute Weber-Schaefer, Lautertal (DE); Theo Held, Wiesloch (DE)

(73) Assignee: SAP AG, Walldorf ( * ) Notice: Subject to any disclaimer, the term of this patent is extended or adjusted under 35 U.S.C. 154(b) by 1173 days.

(21) Appl. No.: 11/247,971

(22) Filed: Oct. 11, 2005

(65) Prior Publication Data

US 2007/0083854 A1    Apr. 12, 2007

(51) Int. Cl.
*G06F 9/44* (2006.01)
*G06F 9/45* (2006.01)
(52) U.S. Cl. ............... 717/124; 717/104; 717/128; 703/22
(58) Field of Classification Search ........... 717/124, 717/128; 703/22
See application file for complete search history.

(56) References Cited

U.S. PATENT DOCUMENTS

| | | | | |
|---|---|---|---|---|
| 5,251,294 | A * | 10/1993 | Abelow | 715/236 |
| 5,999,908 | A | 12/1999 | Abelow | |
| 6,295,509 | B1 * | 9/2001 | Driskell | 702/182 |
| 6,625,805 | B1 * | 9/2003 | Lam et al. | 717/130 |
| 7,350,190 | B2 * | 3/2008 | Torres et al. | 717/105 |
| 7,360,215 | B2 * | 4/2008 | Kraiss et al. | 718/100 |
| 2001/0011211 | A1 * | 8/2001 | Bushey et al. | 703/22 |

OTHER PUBLICATIONS

John et al (Using GOMS for User Interface Design and Evaluation: Which Technique, ACM Transactions on Computer Human Interaction, vol. 3, No. 4, Dec. 1996, p. 287-319).*
Paterno (Tools for Task Modeling: Where we are, Where we are headed, Proceedings of the First International Workshop on Task Models and Diagrams for User Interface Design, 2002, p. 10-17).*
Duncan (Basic Web Resource site, 2003, http://www.fluffbucket.com/html/forms/button.htm).*
John et al (Using GOMS for User Interface Design and Evaluation: Which Technique, ACM Transactions on Computer Human Interaction, vol. 3, No. 4, Dec. 1996, p. 287-319).*
Paterno (Tools for Task Modeling: Where we are, Where we are headed, Proceedings of the First International Workshop on Task Models and Diagrams for User Interface Design, 2002, p. 10-17).*

(Continued)

*Primary Examiner*—Lewis A Bullock, Jr.
*Assistant Examiner*—Hang Pan
(74) *Attorney, Agent, or Firm*—Fish & Richardson P.C.

(57) ABSTRACT

Usability of a software program can be tested by generating a first electronic record of input events that a user executes with at least one input device during a test session. The operations comprise applying the generated first electronic record to a predictive model to generate a prediction for performing the predefined task. Usability of a software program can be tested by registering input events that a user executes with at least one input device during a test session in which the user performs a predefined task of a software program. The operations comprise generating a first electronic record associated with the test session. The first electronic record includes at least one characteristic of the registered input events and a prediction for performing the predefined task. The prediction is generated by applying the registered input events to a predictive model.

18 Claims, 5 Drawing Sheets

OTHER PUBLICATIONS

White Paper: An Overview of Morae™ A Breakthrough in Usability Testing and User Experience Research, 2004, Techsmith Corporation, Okemos, MI.

"Morae Features Overview", [on-line] publication date unavailable [retrieved on Jul. 26, 2005]. Retrieved from Internet: <URL: www.techsmith.com>.

Chapter 3, An Ontology for Task Models, course material from Vrije Universiteit Amsterdam, <URL: http://web.archive.org/web/20040215110221/http://www.cs.vu.nl/~mmc/gta/Chapter3.pdf>.

Bailey, "GOMS and Action Analysis", Fall 2004, PowerPoint Presentation, 26 pages.

Kieras, "GOMS Models—Simplified Cognitive Architectures", PowerPoint Presentation, 41 pages.

John, Bonnie E. et al., "The GOMS Family of User Interface Analysis Techniques: Comparison and Contrast", *ACM Transactions on Computer-Human Interaction*, vol. 3, No. 4, Dec. 1996, pp. 320-351.

Kieras, David, "A Guide to GOMS Model Usability Evaluation using GOMSL and GLEAN3", University of Michigan, Jan. 12, 1999, pp. 1-12.

"Seminar on Cognitive Modeling for UI Design", [on-line] publication date unavailable [retrieved on Aug. 26, 2005]. Retrieved from the Internet:<URL:http://www.cs.cmu.edu/~bej/CognitiveModelingForUIDesign/.

"GOMS", [on-line] publication date unavailable [Retrieved on Aug. 26, 2005]. Retrieved from the Internet:<URL: http://www.cs.umd.edu/class/fall2002/cmsc838s/tichi/goms.html>.

"GOMS Analysis", [on-line] Dec. 1997, [retrieved on Aug. 26, 2005]. Retrieved from the Internet: <URL: http://www.cc.gatech.edu/classes/cs6751_97_fall/projects/closet2000+/FinalEssays/goms . . . >.

"Human-Computer Interaction", [on-line] *A guide to GOMS Task Analysis* (summary), 1994, [retrieved on Aug. 26, 2005]. Retrieved from the Internet: <URL: http://www.cc.gatech.edu/computing/classes/cs6751_98_fall/handouts/GOMS-Kieras.html>.

"GOMS Models: An Approach to Rapid Usability Evaluation", [on-line] publication date unavailable [Retrieved on Aug. 26, 2005]. Retrieved from the Internet: <URL: http://www.eecs umich.edu/~kieras/goms.html>.

"Analyzing Graphic and Textual Layouts with GOMS", [on-line] publication date unavailable [Retrieved on Aug. 26, 2005]. Retrieved from the Internet: <URL: http://www.cs.cmu.edu/~pane/GOMS/>.

"GOMS Model (Card, Moran & Newell", [on-line] publication date unavailable [Retrieved on Aug. 26, 2005]. Retrieved from the Internet: <URL: http://tip.psychology.org/card.html>.

"GOMS Keystroke-Level Model", [on-line] publication date unavailable [Retrieved on Aug. 26, 2005]. Retrieved from the Internet: <URL: http://www.sju.edu/~jhodgson/gui/goms_keys.html>.

"Project Ernestine: Validating a GOMS Analysis for Predicting and Explaining Real-world Performance", [on-line] publication date unavailable [Retrieved on Aug. 26, 2005]. Retrieved from the Internet: <URL: http://www.rpi.edu/~grayw/pubs/papers/GJA93_HCIj.html>.

"Outline of steps in PS Interface for Managers", [on-line] publication date unavailable [Retrieved on Aug. 26, 2005]. Retrieved from the Internet: <URL: http://iat.ubalt.edu/courses/old/idia612.185_Sp03/GOMS/goms_analysis.html>.

"Methods:GOMS", [on-line] publication date unavailable [Retrieved on Aug. 26, 2005]. Retrieved from the Internet: <URL: http://www.usabilityfirst.com/methods/goms.txl>.

"GOMS", [on-line] publication date unavailable [Retrieved on Aug. 26, 2005]. Retrieved from the Internet: <URL: http://www.it.bton.ac.uk/staff/rng/teaching/notes/GOMS.html>.

John et al., "Automating CPM-GOMS," *CHI2002: changing the world, changing ourselves*, Minneapolis, Minnesota, vol. 4, issue 1, Apr. 2002, pp. 147-154.

Long, "GOMS, CS 160 Discussion", Mar. 5, 1997, PowerPoint Presentation, 21 pages.

John, Bonnie, "Why GOMS?", *Interactions*, Oct. 1995, pp. 81-89.

Kieras, David, "A Guide to GOMS Task Analysis", Spring, 1994, pp. 1-47.

"GOMS", [on-line]. Wikipedia, the free encyclopedia, [retrieved on Aug. 26, 2005]. Retrieved from the Internet: <URL: http://en.wikipedia.org/wiki/GOMS>.

\* cited by examiner

TESTING USABILITY OF A SOFTWARE PROGRAM

TECHNICAL FIELD

The description relates to testing usability of a software program and applying a generated record to a predictive model.

BACKGROUND

When software programs are designed and developed, typically some effort is made in an attempt to make the resulting program easy and convenient to use. For example, programs should be logically arranged and configured, from the user's perspective, such that when the program is released, the user's time can be spent primarily on working with the program. This quality of the program is generally referred to as the usability of the program, where a high usability is generally regarded as a desirable feature.

It is however not practically possible to completely evaluate the program's usability during the development stage. While experiences with other software programs or earlier versions of the same program may give valuable indications on the best design, there are typically some characteristics in the final product (good or bad) that were not foreseeable at the earlier stages. For this reason, it is common to perform test sessions where users try the proposed software product by performing one or more of its predefined tasks. Typically, such test sessions are monitored by test personnel, or automatically by recording equipment, so that the test session can later be evaluated. The software product may also be tested to determine whether it performs the functions that it was created to perform, and that it operates reliably. Usability testing is typically performed when such more basic testing has been completed.

During the test sessions, users interact with the software program using any or all equipment that is commonly associated with computers. For example, the software may require the user to enter information on a keyboard, manipulate screen items using a mouse or other pointer device, and read information on a graphical user interface (GUI) presented on a display device. Each of these operations takes a finite amount of time. Thus, the time taken by any user to complete the test session may be seen as an accumulation of time spent reading the GUI, entering text with the keyboard, using the mouse, moving the hand between the keyboard and the mouse, talking with the test instructor or receiving instructions, etc. The latter category represents time that is to be extracted from the total measured time so that it does not skew the test results. The former categories represent time that may be a relevant indicator of usability.

There exists predictive models for evaluating software. One predictive model is the so called Goals, Operators, Methods and Selection rules (GOMS) model that allows calculation of a "theoretical" time for performing a given sequence of inputs. That is, the GOMS model assigns a fixed time value to many operations that the user can perform, from a single keystroke or mouse click to moving the hand between the keyboard and mouse. If information defining a predetermined sequence of keystrokes, hand movements and mouse operations is applied to such a GOMS model, it can generate a theoretical prediction of the time required for a user to perform the inputs. The outputs generated by existing solutions for testing software products do not integrate these predictions with the test results. Also, it is typically a complicated procedure to enter into the predictive model the information defining the predetermined sequence of inputs executed by the user.

SUMMARY

In a first general aspect, a computer program product tangibly embodied in an information carrier includes instructions that, when executed, cause a processor to perform operations for testing usability of a software program. The operations comprise generating a first electronic record of input events that a user executes with at least one input device. The first electronic record is generated during a test session in which the user performs a predefined task of a software program. The operations comprise applying the generated first electronic record to a predictive model to generate a prediction for performing the predefined task.

Selected embodiments may include any or all of the following features. The predictive model may be a GOMS model. The operations may further comprise generating a second electronic record associated with the test session, the second electronic record including the prediction and at least one characteristic of the executed input events. The prediction may be a predicted time for performing the predefined task, and the characteristic may be an actual time the user takes to perform the predefined task. Irrelevant time may be deducted from the actual time. The prediction may be a predicted number of input events for performing the predefined task and the characteristic may be an actual number of the executed input events. The predefined task may be performed under guidance of a graphical user interface based on coding, and the operations may further comprise analyzing the coding to determine the characteristic. The user may execute at least a sequence of the input events by continuously depressing a key on the input device, and the sequence may be regarded as a single input event in determining the characteristic.

In a second general aspect, a method for testing usability of a software program comprises registering input events that a user executes with at least one input device during a test session in which the user performs a predefined task of a software program. The method comprises generating a first electronic record associated with the test session. The first electronic record includes at least one characteristic of the registered input events and a prediction for performing the predefined task. The prediction is generated by applying the registered input events to a predictive model.

Selected embodiments may include one or more of the following features. The prediction may be a predicted time for performing the predefined task, and the characteristic may be an actual time the user takes to perform the predefined task. Irrelevant time may be deducted from the actual time. The prediction may be a predicted number of input events for performing the predefined task and the characteristic may be an actual number of the registered input events. The user may execute at least a sequence of the input events by continuously depressing a key on the input device, and the sequence may be regarded as a single input event in determining the characteristic. The predefined task may be performed under guidance of a graphical user interface based on coding, and the operations may further comprise analyzing the coding to determine the characteristic. Analyzing the coding may comprise detecting elements, markup tags and class attributes that are included in the coding. A first element, a first markup tag and a first class attribute may correspond to a user-selectable button in the software program, and the first element, the first markup tag and the first class attribute may correspond to a user-selectable link in another version of the software program. Analyzing the coding may comprise assigning unique names to all possible input events associated with the software program. Assigning the unique names may comprise recording the unique names in a configuration file during a calibration session. The method may further comprise generating a second electronic record of the input events during the test session, and applying the generated second electronic record to the predictive model to generate the prediction.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
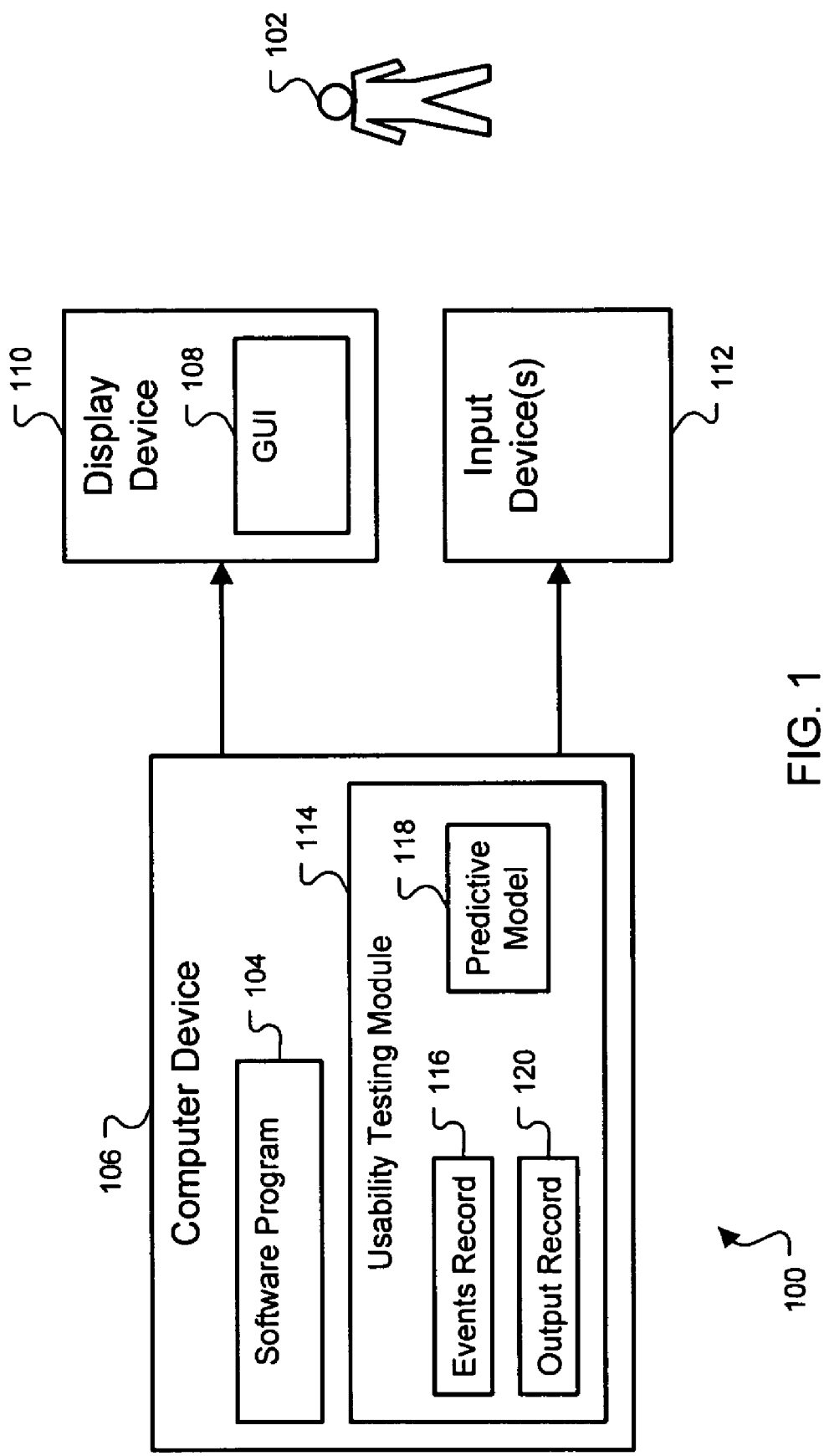
FIG. 1 is a block diagram of a system for testing usability of a software program including a computer device and a graphical user interface (GUI)

FIG. 1 shows a system 100 for testing usability of a software program. A user executes input events with one or more input devices during a test session in which the user performs a predefined task of a software program. The system 100 applies the input events to a predictive model to generate a prediction for performing the predefined task. The system 100 may generate a record for the test session that includes the prediction and at least one characteristic of the input events.

Particularly, a user 102 interacts with a software program 104 running on a computer device 106. The software program 104 presents to the user 102 a graphical user interface (GUI) 108 on a display device 110. The user 102 makes inputs to the software program 104 through input device(s) 112, such as a mouse or a keyboard.

A usability testing module 114 may record in an events record 116 input events that the user 102 executes with the input device(s) 112. For example, the usability testing module 114 may record the name of a screen viewed by the user 102, a track of the user's mouse including a start point and an end point, keys selected on a keyboard, items selected using the mouse, a change of input device, time elapsed to complete an action, or time elapsed for a roundtrip between the computer device 106 and another computer system in communication with the computer device 106.

The usability testing module 114 applies the registered input events, for example in form of the events record 116, to a predictive model 118 to generate a prediction for performing the predefined task. The usability testing module 114 may output the prediction and one or more characteristics of the executed input events to the user 102 in an output record 120.

For example, the events record 116 may include a series of mouse clicks and keyboard keystrokes executed by the user 102 while performing a predefined task. The usability testing module 114 applies the events record 116 to the predictive model 118 to generate a prediction for the amount of time needed to perform the mouse clicks and the keystrokes. The usability testing module 114 outputs to the user 102 the prediction and the actual time spent by the user 102 performing the mouse clicks and keystrokes in the output record 120. The output record 120 may be a report, such as a bar graph including predicted and actual times to perform several types of actions.

Figure 2:
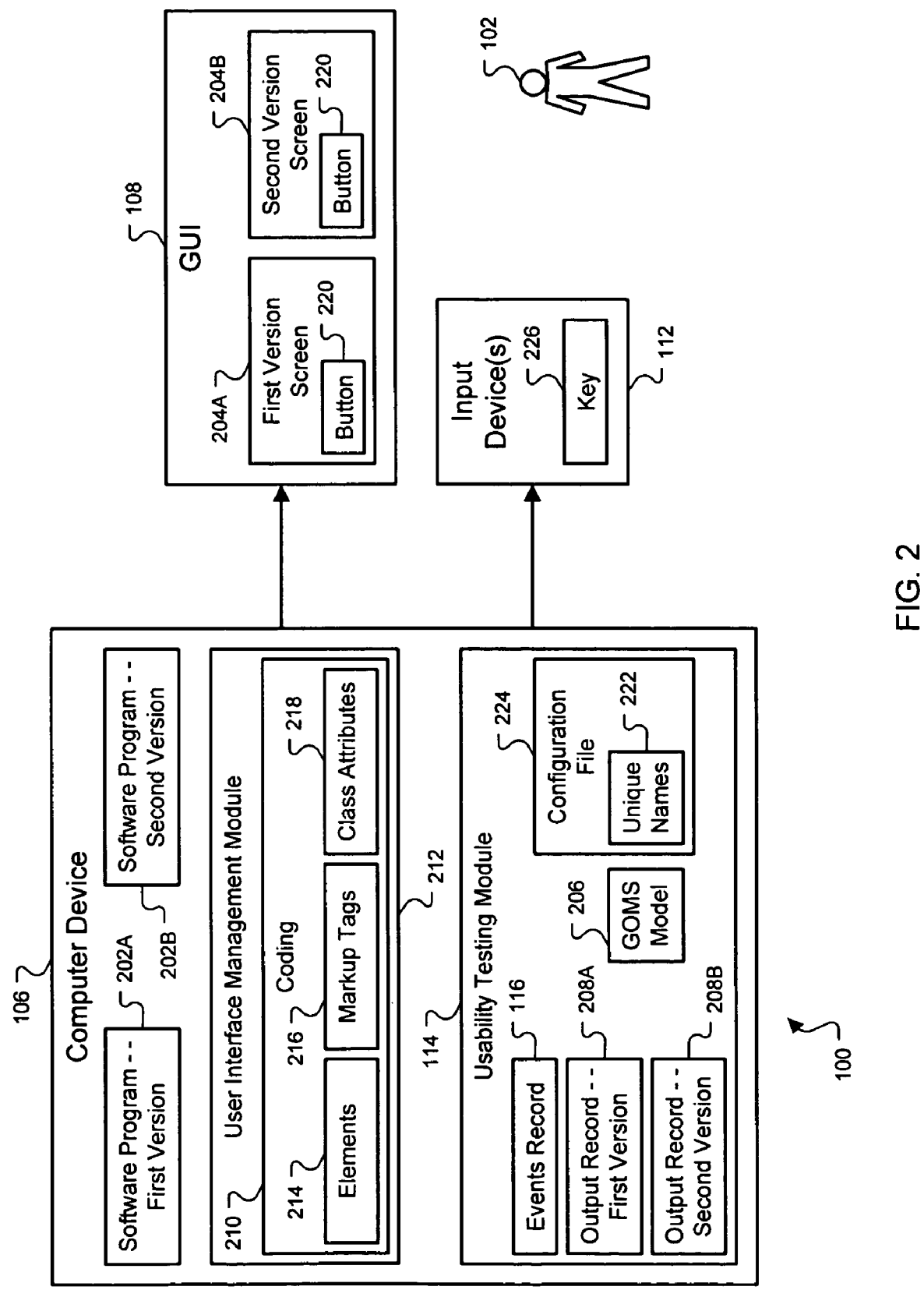
FIG. 2 is a block diagram of the system of FIG. 1 showing more detail in the computer device and the GUI.

FIG. 2 shows the usability testing system 100 of FIG. 1 in a configuration that allows the comparison of two versions of a software program. The computer device 106 includes a first version of a software program 202A and a second version of a software program 202B. The first and second versions of the software program 202A, 202B present first and second version screens 204A, 204B, respectively, to the user 102 at the GUI 108.

The usability testing module 114 generates the events record 116 of the input events that the user 102 executes with the input device(s) 112 while performing a predefined task in each of the first and second versions of the software program 202A, 202B. The usability testing module 114 applies the events record 116 to the predictive module, such as a Goals, Operators, Methods, and Selection rules (GOMS) model 206, to generate a prediction for performing a predefined task. The usability testing module 114 outputs a prediction and one or more characteristics of input events for performing the predefined task using the first version of the software program 202A in a first version output record 208A. The usability testing module 114 outputs a prediction and one or more characteristics of input events for performing the predefined task using the second version of the software program 202B in a second version output record 208B. The usability testing module compares the two output records 208A, 208B, for example, to determine which version is more usable. In another implementation, the outputs for the first and second versions of the software program 202A, 202B are contained in the same output record and can be compared in that record.

The usability testing module 114 can process the recorded inputs. For example, it can deduct irrelevant time when the user is communicating with test personnel from the total measured time. This may improve the reliability of the obtained test results and may allow better comparisons between different test sessions. There may be defined in the usability testing module a time interval for an assumed maximum idle time between actions that the user is to perform within an interaction flow. If the user exceeds this time interval during the test session, a counter for "irrelevant time" or idle time is started. The counter is stopped when the usability testing module detects and records the user's next action. For example, the maximum idle for a task sequence may be set to 2 seconds. After 2 seconds without any user input (no click, no keystroke, etc.), the counter is started. In this example, the user hits a key on the keyboard thirty seconds after the counter is started. An idle time of 32 seconds is recorded and can be deducted from the overall time.

In some implementations, the user 102 performs the predefined task under the guidance of the GUI 108 where the GUI 108 is based on coding 210. A user interface management module 212 contains the coding 210. The coding 210 may be written in a markup language, such as in Hypertext Markup Language (HTML). The coding 210 may be based on elements 214, markup tags 216, and class attributes 218.

The usability testing module 114 analyzes the coding as part of the process of determining the one or more characteristics to present in the output record. The coding analysis may serve to distinguish unrelated events from each other, to name one example. For example, in analyzing the coding 210, the usability testing module 114 may detect elements 214, markup tags 216, and class attributes 218 and associate them with the respective unique events that the user can execute, such as clicking on a screen icon, button or link. Particularly, in the first version of the software program 202A a certain element, markup tag, and class attribute may correspond to the activation of an input control such as a button 220, while in the second version of the software program 202B it may correspond to a link in the second version screen 204B that performs the predefined task. However, on the second version screen 204B, the link appears as the button 220. In other words, to the user the button in the GUI appears identical in the two software versions, but the underlying coding has been changed from a "click-on-button" event to a "click-on-link" event. In analyzing the coding 210 in the illustrated embodiment, the usability testing module 114 assigns unique names 222 to all possible input events associated with the software programs 202A, 202B. During a calibration session, the usability testing module 114 records the unique names 222 in a configuration file 224. For example, during the calibration session a person enters calibration data via a dedicated part of the usability testing module. The calibration data provides that the unique names are assigned to the possible input events. In general, any given aspect of the predefined task has the same unique identifier in the two different versions of the software program 202A, 202B. This avoids the clicks on the button 220 in the first version screen 204A being grouped in a category that is compared with the category for the clicks on the link in the second version screen 204B.

In some implementations, the input device(s) 112 includes at least one key 226, such as any of the several keys on a keyboard. At some point during the test session, the user temporarily pauses while depressing the key 226, perhaps inadvertently upon considering the next operation to be performed in the predefined task. Typically, the keyboard has an automatic repeater function that then makes a sequence of inputs from the key as long as it is depressed. The usability testing module 114 can distinguish the sequence of entries resulting from the depressed key from entries that the user deliberately makes by repeatedly depressing and then releasing the key. For example, the characteristic speed or regularity of the automatically made entries may be detected. The usability testing module 114 therefore regards the sequence of entries as a single input event when determining the characteristic reported in the output records. This may eliminate a skewing of the statistics of the test session that may otherwise result.

Figure 3:
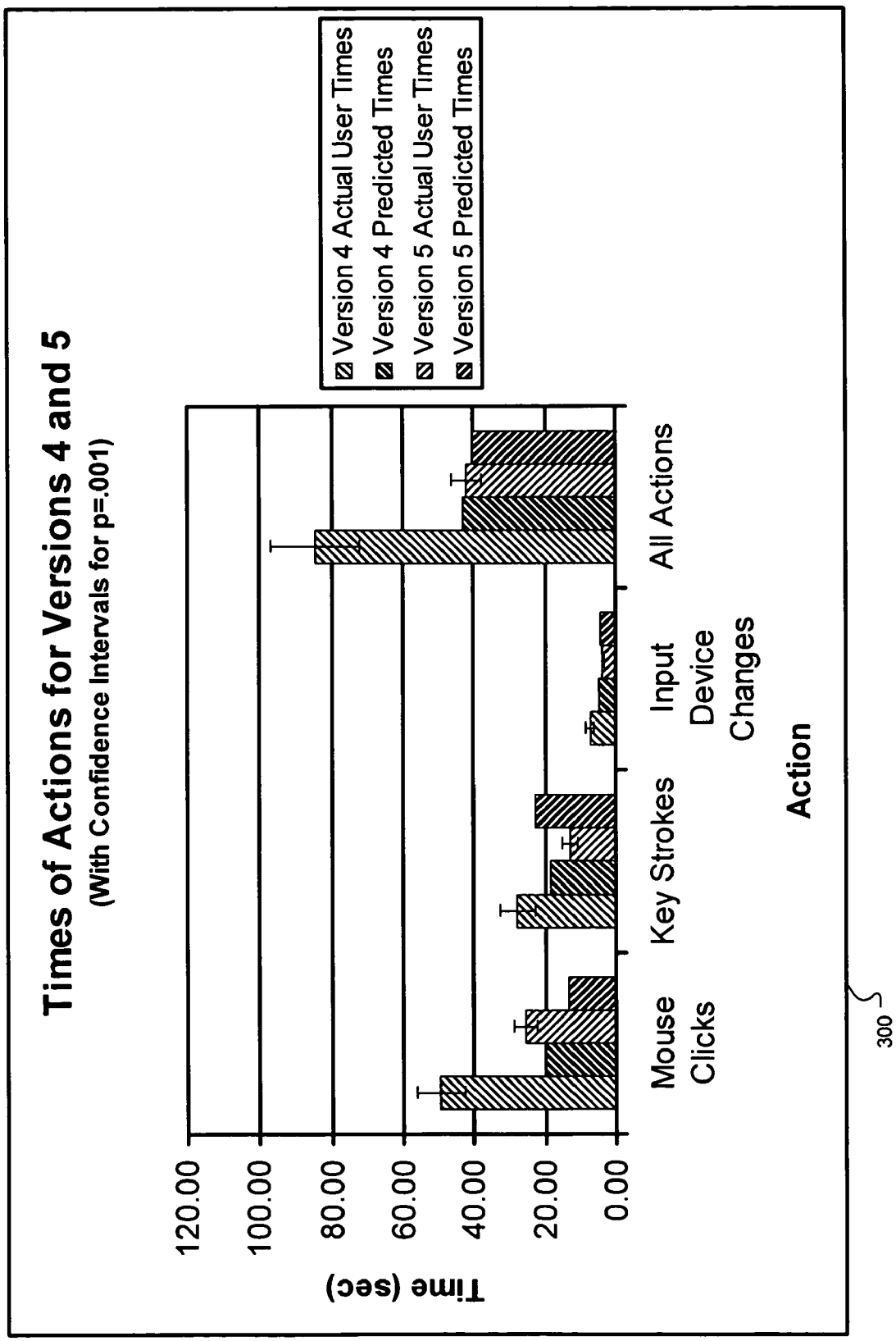
FIG. 3 is a graph of time spent by users while performing several predefined tasks and predicted times to perform the tasks using two versions of a software program.

FIG. 3 shows a graph 300 that can be included in the output record 120. Here, versions 4 and 5 of a software program, referred to as Versions 4 and 5, respectively, correspond to the two versions of the software program 202A, 202B. For example, the graph 300 is generated at a test session where users perform corresponding predefined tasks in Version 4 and Version 5 for purposes of evaluating the latter. Particularly, a number of users may independently perform the predefined task using the two program versions (such as by working first with Version 4 and then with Version 5), and the results may thereafter be aggregated into the graph 300.

The graph 300 compares for the two versions of the software program 202A, 202B the amount of time in seconds spent by the users and the predicted time for mouse clicks, key strokes, input device changes, and all three actions combined while performing the predefined task. Thus, the graph 300 presents a combination of the information in the output records 208A, 208B, wherein the characteristic of the input events is the actual time the users take to perform the predefined task and the predicted time to perform the predefined task. Upon viewing the graph 300, a person evaluating the test session can recognize that regarding mouse clicks the predicted times for Version 4 are significantly higher that the predicted times for Version 5. Similarly, the predicted time for all actions is lower for the Version 5 than for Version 4 although the former appears to require more keystrokes.

Figure 4:
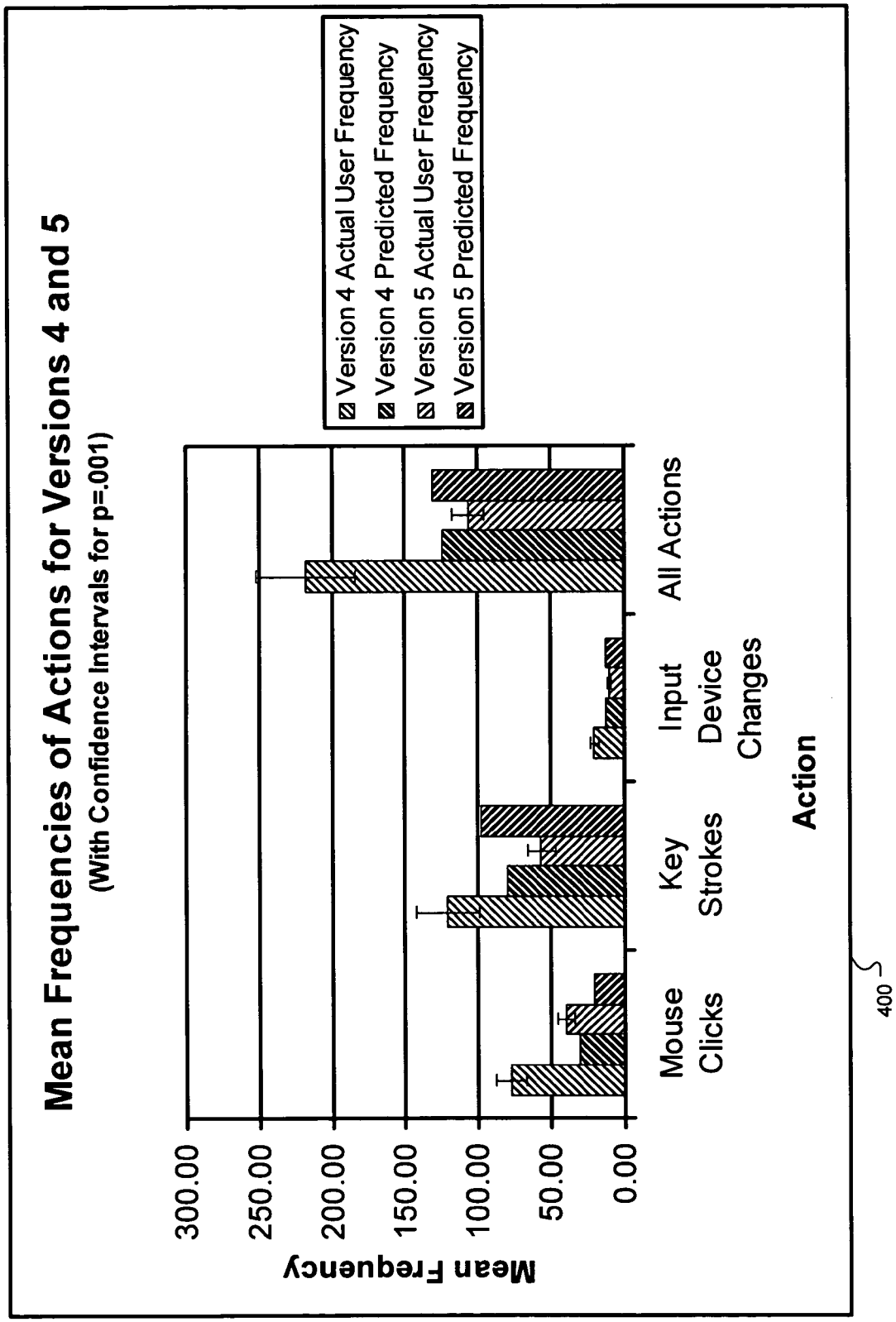
FIG. 4 is a graph of the number of input events made by users while performing several predefined tasks and predicted numbers of input events to perform the tasks using two versions of a software program.

FIG. 4 shows a graph 400 resulting from the same test session of Versions 4 and 5. The graph 400 compares for the two versions of the software program 202A, 202B the number of input events made by the user and the predicted number of input events for mouse clicks, key strokes, input device changes, and all three actions combined while performing the predefined task. These values are here referred to as "mean frequencies" because they are average tallies of the number of input events. Here, the output records 208A, 208B include the characteristic of the input events comprising the actual number of input events the user 102 makes to perform the predefined task and the predicted number of input events to perform the predefined task. Upon viewing the graph 400, a person evaluating the test session can recognize the following: Version 4 appears to require a significantly higher number of actions than Version 5; the predicted frequency for Version 5 requires fewer mouse clicks and device changes than the corresponding Version 4 scenario; and the relatively high number of predicted keystrokes in Version 5 compared to the actual test results may be caused by the lower amount of text entered in certain fields of the software.

Figure 5:
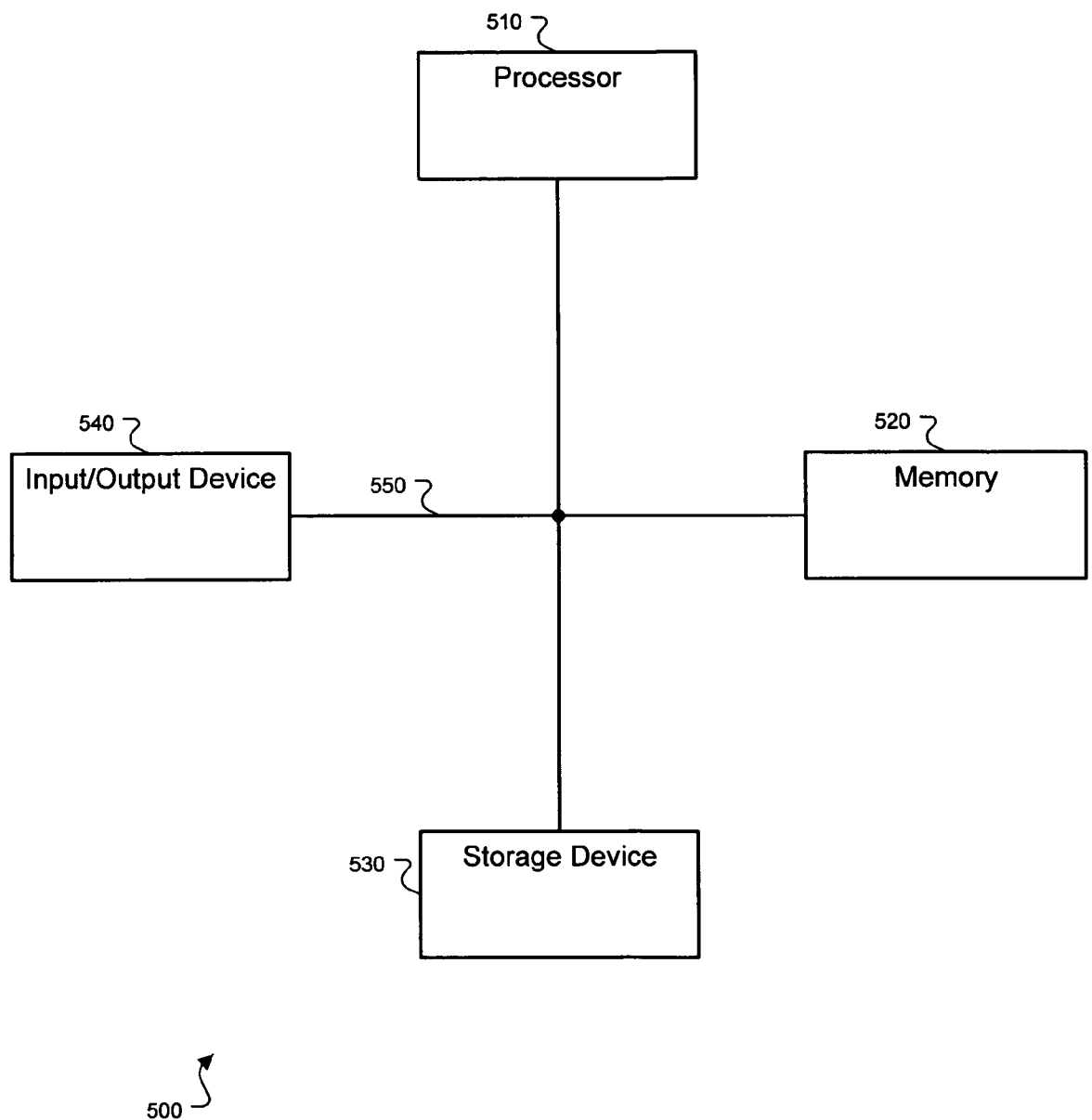
FIG. 5 is a block diagram of a general computer system.

FIG. 5 is a block diagram of a computer system 500 that can be used in the operations described above, according to one embodiment. For example, the system 500 may be included in the system 100.

The system 500 includes a processor 510, a memory 520, a storage device 530, and an input/output device 540. Each of the components 510, 520, 530, and 540 are interconnected using an interconnection network 550 (e.g., a system bus). The processor 510 is capable of processing instructions for execution within the system 500. In one embodiment, the processor 510 is a single-threaded processor. In another embodiment, the processor 510 is a multi-threaded, dual-core microprocessor. Although a single processor 510 is illustrated, one skilled in the art will appreciate that a plurality of processors may be used in a multi-processor configuration or clustered computing configuration. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various other embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

Embodiments of the invention can be implemented in electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. A computer includes a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The present disclosure can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the disclosure. Accordingly, other embodiments are within the scope of the following claims.

What is claimed is:

1. A method for testing usability of a software program, the method comprising:
    analyzing code of first and second versions of the software program for possible input events;
    generating calibration data assigning an identical unique identifier of a predefined task to specific input events from among the possible input events in the first and second versions of the software program;
    registering first input events from among the specific input events that a user executes with at least one input device during a test session in which the user performs the predefined task in the first version of the software program;
    generating a first electronic output record associated with the test session for the first version of the software program, the first electronic record including at least one characteristic of the registered first input events and a first prediction for performing the predefined task generated by applying the registered first input events to a predictive model;
    registering second input events from among the specific input events that a user executes with at least one input device during the test session in which the user performs the predefined task in the second version of the software program;
    generating a second electronic output record associated with the test session for the second version of the software program, the second electronic record including the characteristic of the registered second input events and a second prediction for performing the predefined task generated by applying the registered second input events to the predictive model; and
    comparing the first and second electronic output records using the identical unique identifiers of the first and second input events.

2. The method of claim 1, further comprising recording the calibration data in a configuration file.

3. The method of claim 1, further comprising displaying results from the comparison of the first and second electronic output records in a graph.

4. The method of claim 1, further comprising aggregating test results from the first and second input events from different users.

5. The method of claim 1, wherein the predictive model is a Goals, Operators, Methods, Selection rules (GOMS) model.

6. The method of claim 1, wherein the first and second predictions are predicted times for performing the predefined task, and wherein the characteristic of the registered first and second input events is an actual time the user takes to perform the predefined task.

7. The method of claim 6, further comprising determining that an amount of idle time has elapsed during the actual time that is greater than a maximum idle time and, in response to the determination, deducting the idle time from the actual time.

8. The method of claim 1, wherein the first and second predictions are predicted numbers of input events for performing the predefined task, and wherein the characteristic of the registered first and second input events is an actual number of the registered first and second input events.

9. The method of claim 1, wherein the predefined task is performed under guidance of a graphical user interface based on coding, and wherein the method further comprises analyzing the coding to determine the characteristic.

10. A computer program product tangibly embodied in a computer-readable medium, the computer program product including instructions that, when executed, cause a processor to perform operations comprising:

analyzing code of first and second versions of the software program for possible input events;

generating calibration data assigning an identical unique identifier of a predefined task to specific input events from among the possible input events in the first and second versions of the software program;

registering first input events from among the specific input events that a user executes with at least one input device during a test session in which the user performs the predefined task in the first version of the software program;

generating a first electronic output record associated with the test session for the first version of the software program, the first electronic record including at least one characteristic of the registered first input events and a first prediction for performing the predefined task generated by applying the registered first input events to a predictive model;

registering second input events from among the specific input events that a user executes with at least one input device during the test session in which the user performs the predefined task in the second version of the software program;

generating a second electronic output record associated with the test session for the second version of the software program, the second electronic record including the characteristic of the registered second input events and a second prediction for performing the predefined task generated by applying the registered second input events to the predictive model; and comparing the first and second electronic output records using the identical unique identifiers of the first and second input events.

11. The computer program product of claim 10, wherein the operations further comprise recording the calibration data in a configuration file.

12. The computer program product of claim 10, wherein the operations further comprise displaying results from the comparison of the first and second electronic output records in a graph.

13. The computer program product of claim 10, wherein the operations further comprise aggregating test results from the first and second input events from different users.

14. The computer program product of claim 10, wherein the predictive model is a Goals, Operators, Methods, Selection rules (GOMS) model.

15. The computer program product of claim 10, wherein the first and second predictions are predicted times for performing the predefined task, and wherein the characteristic of the registered first and second input events is an actual time the user takes to perform the predefined task.

16. The computer program product of claim 10, wherein the operations further comprise determining that an amount of idle time has elapsed during the actual time that is greater than a maximum idle time and, in response to the determination, deducting the idle time from the actual time.

17. The computer program product of claim 10, wherein the first and second predictions are predicted numbers of input events for performing the predefined task, and wherein the characteristic of the registered first and second input events is an actual number of the registered first and second input events.

18. The computer program product of claim 10, wherein the predefined task is performed under guidance of a graphical user interface based on coding, and wherein the operations further comprise analyzing the coding to determine the characteristic.

\* \* \* \* \*